US 6,577,784 B2

(12) United States Patent
Horino et al.

(10) Patent No.: US 6,577,784 B2
(45) Date of Patent: Jun. 10, 2003

(54) OPTICAL SWITCH

(75) Inventors: Masaya Horino, Yasato (JP); Hisao Kurosawa, Fukaya (JP); Masafumi Kokubo, Kumagaya (JP); Hideaki Tsushima, Komae (JP)

(73) Assignees: Hitachi, Ltd., Tokyo (JP); Hitachi Metals, Ltd., Tokyo (JP)

( * ) Notice: Subject to any disclaimer, the term of this patent is extended or adjusted under 35 U.S.C. 154(b) by 33 days.

(21) Appl. No.: 09/828,980

(22) Filed: Apr. 10, 2001

(65) Prior Publication Data

US 2002/0003921 A1 Jan. 10, 2002

(30) Foreign Application Priority Data

Apr. 10, 2000 (JP) ........................................ 2000-113216

(51) Int. Cl.⁷ .............................. G02B 6/26; G02B 6/42
(52) U.S. Cl. ............................ 385/20; 385/16; 385/39; 385/50; 359/315; 359/320
(58) Field of Search ............................ 385/20, 16, 50, 385/15, 39, 40, 21, 57, 71; 359/315, 320, 128

(56) References Cited

U.S. PATENT DOCUMENTS 6,102,582 A * 8/2000 Espindola et al. .......... 385/140

FOREIGN PATENT DOCUMENTS

JP                05249386 A * 9/1993 ........... G02B/26/08

* cited by examiner

Primary Examiner—Audrey Chang
Assistant Examiner—Denise S. Allen
(74) Attorney, Agent, or Firm—Antonelli, Terry, Stout & Kraus, LLP

(57) ABSTRACT

In order to provide a small-sized and compact optical switch of 1×4 type. Two movable optical fibers are fixed on a substrate by a fixing block disposed in a middle portion of the fibers. Two movable blocks made of a soft magnetic body are mounted to the both ends of the movable optical fibers. Two soft magnetic fixing blocks are arranged on the substrate for fixing one optical fiber so as to oppose to one of the movable block, and for fixing four optical fibers so as to oppose to the movable block, respectively. Two movable blocks can be independently moved with respect to the respective fixing blocks by means of actuators. Further, it is possible to detect a position of each movable block with respect to the fixing block by means of detecting electrodes.

7 Claims, 5 Drawing Sheets

OPTICAL SWITCH

BACKGROUND OF THE INVENTION

1. Field of the Invention

The present invention relates to an optical switch for switching information transmitted by using a transmitting medium into a plurality of paths, and more particularly to an optical switch suitable for a transmitting medium of a wavelength division multiplexing (WDM) system.

2. Description of the Prior Art

There has been conventionally employed an optical transmission having an advantage that a lot of information can be transmitted at a high speed. Particularly, a wavelength division multiplexing (WDM) is a influential means because a large capacity of data can be transmitted. In the case of transmitting such a lot of data, it is efficient to selectively utilize necessary information in a receiving side, and thus required information is selected from the transmitted information by using a switching means. Further, in a digital calculator or the like utilizing an optical communication, there is a case that a plurality of communication circuits are provided and the communication circuits are selectively used by being switched. For this switching operation, an optical switch is a influential means.

Accordingly, in recent years, various kinds of optical switches have been proposed. For example, JP-A-5-249386 discloses an optical switch outputting information input from one input fiber to four output fibers. This optical switch, which directly moves an optical fiber, comprises an array constituted by two fibers and fixed in its middle portion, one fiber movably provided on one end side of the array, four fibers movably provided on another end side, and a drive means driving each of the movable fibers so as to align respective optical axes.

SUMMARY OF THE INVENTION

The optical switch described in the publication mentioned above has an advantage that it has a double switching capacity in comparison with a so-called 1×2 optical switch used conventionally. However, since four movable fiber arrays are moved at a time of switching the optical switch, larger drive force is required for the driving means in comparison with the 1×2 optical switch. Further, although a position of the movable optical fiber is considered a little, the consideration is not sufficient yet. In the case of moving one movable fiber, for example, there has been a risk that a front end of the fiber rotates within a switching plane, and thus the efficiency of the combination of the light is reduced.

The present invention is made by taking the problems of the conventional art mentioned above into consideration, and an object of the present invention is to realize a small-sized and compact optical switch. Another object of the present invention is to increase the efficiency of the combination by the optical switch.

In order to achieve the objects mentioned above, in accordance with an aspect of the present invention, there is provided an optical switch comprising a substrate, a first fixing member for fixing one end of an optical fiber on one end portion of the substrate, a second fixing member for fixing at least two ends of optical fibers on another end portion of the substrate, a fiber array comprising at least two optical fibers lined in parallel of which the midpoint is fixed on the substrate so that the fiber array extends between the end portions of the substrate and, and a movable device for moving an end of the fiber array with respect to the substrate.

In the aspect mentioned above, the second fixing member may fix four ends of optical fibers, the fiber array may comprise two optical fibers, and the movable device may comprise a driving device provided on each end portions of the substrate for moving respective ends of the fiber array.

Further, it is preferable that a holding member is provided on each end portion of the fiber array so as to form a parallel leaf spring structure in which the fiber array operates as an elastic body, and that the driving device moves the holding member with respect to the substrate for moving the end of the fiber array.

Furthermore, each of the first fixing member, the second fixing member and the holding members may be made of a soft magnetic material, and the movable device may be an electromagnetic actuator cooperating with the members, so that the holding members are accurately positioned with respect to the first fixing member and the second fixing member respectively.

A description will be given of some embodiments in accordance with the present invention with reference to the accompanying drawings.

DESCRIPTION OF THE PREFERRED EMBODIMENTS

Figure 3:
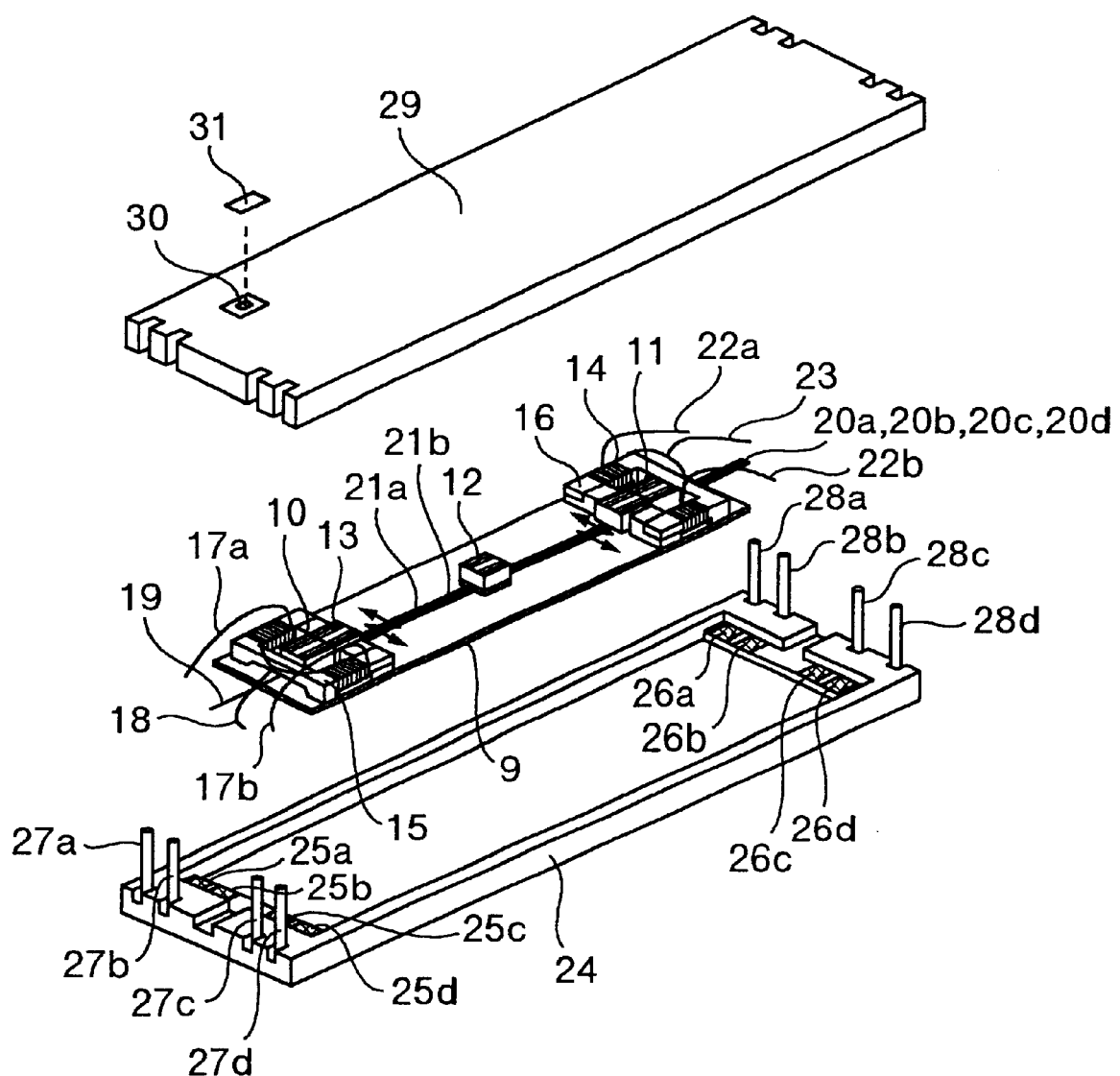
FIG. 3 is a perspective view of the embodiment of the optical switch in accordance with the present invention.

FIG. 3 is an exploded perspective view of an embodiment of an optical switch in accordance with the present invention. The optical switch in accordance with the present embodiment is a 1×4 optical switch having a switching position detecting function. Fixed fiber holding blocks 10 and 11 and a middle fiber fixing block 12 are fixed at the both end sides of a substrate 9. One input fiber 19 is fixed to the fixed fiber holding block 10. Further, four output fibers 20a, 20b, 20c and 20d are fixed to the fixed fiber holding block 11.

The middle fiber fixing block 12 is fixed to and arranged in a portion near a center of the substrate 9. Two middle fibers 21a and 21b having an equal length are fixed to the middle fiber fixing block 12 substantially in those center portion. Movable fiber holding blocks 13 and 14 are attached to the both ends of the middle fibers 21a and 21b, and the positions of the movable fiber holding blocks 13 and 14 can be set in the fixed fiber holding blocks 10 and 11 respectively.

An electromagnetic actuator 15 is mounted on the substrate 9 in both side portions of the fixed fiber holding block 10 and the movable fiber holding block 13 so as to be capable of switching a direction of pulling the movable fiber holding block 13. In the same manner, an electromagnetic actuator 16 is mounted on the substrate 9 in both side portions of the fixed fiber holding block 11 and the movable fiber holding block 14 and.

The electromagnetic actuator 15 is provided with driving electrodes 17a and 17b and a detecting electrode 18.

Accordingly, it is possible to achieve one input and two outputs, that is, perform a 1×2 optical switch. Further, the detecting electrode 18 is also used for detecting the switching position. In the same manner, the electromagnetic actuator 16 also has driving electrodes 22a and 22b and a detecting electrode 23 to achieve two inputs and four outputs, that is, perform a 2×4 optical switch and detect the switched position.

Inner electrodes 25a and 25d are provided near both end portions of a base 24 accommodating the substrate 9, and the driving electrodes 17a and 17b are electrically connected to the inner electrodes 25a and 25d. In FIG. 3, however, the substrate 7 is separated from the base 24 for explaining the structure of the switch, and thus a connection between the driving electrodes 17a and 17b and the inner electrodes 25a and 25d is omitted. The detecting electrode 18 is electrically connected to an inner electrode 25b or 25c. In the same manner, the driving electrodes 22a and 22b are electrically connected to inner electrodes 26a and 26d, and the detecting electrode 23 is electrically connected to an inner electrode 26b or 26c.

After accommodating the substrate 9 and the respective parts mounted on the substrate 9 into the base 24, a cover 29 is bonded in a well airtight condition. Then, a refractive index matching fluid (not shown) is charged from a hole 30 provided in the cover. Since a plate 31 is bonded to the hole 30 in a well airtight condition, the charged refractive index matching fluid does not leak out to an external portion. The inner electrodes 25a to 25d are electrically connected to outer electrodes 27a to 27d in the base 24. In the same manner, the inner electrodes 26a to 26d are electrically connected to outer electrodes 28a to 28d. accordingly, it is possible to drive the optical switch and detect the switching position by using the outer electrodes, even after covering the base 24 by the cover 29 so as to seal in a well airtight condition.

Next, details of a light switching portion in the embodiment mentioned above will be shown in FIG. 1. There is shown a state that an input optical signal transmitted through middle fibers (movable optical fibers) 1a and 1b for switching is transmitted to output optical fibers 4a to 4d. End portion of each of the movable optical fibers 1a and 1b is held by a groove formed in a movable fiber holding block 5. Further, this holding block 5 has grooves 3a and 3b formed outside the groove holding the movable fibers 1a and 1b for allowing positioning pins 2a and 2b to slide in a lateral direction. After holding the end portions of the movable optical fibers 1a and 1b and the positioning pins 2a and 2b in the respective grooves 3a and 3b, a cap plate 7 is bonded and fixed to the holding block 5.

In order to fix the fixed optical fibers 4a and 4b so as to oppose to the movable optical fiber 1a and fix the fixed optical fibers 4c and 4d so as to oppose to the movable optical fiber 1b in an axial direction of the movable optical fibers 1a and 1b, a fixed fiber holding block 6 is fixed on the substrate. The fixed fiber holding block 6 has grooves formed thereon for holding the end portions of the output side optical fibers 4a to 4d and the positioning pins 2a and 2b. After accommodating the end portions of the optical fibers 4a to 4d and the positioning pins 2a and 2b in the grooves, a cap plate 8 is bonded and fixed to the fixed fiber holding block 6. At a time of bonding and fixing the holding blocks 5 and 6 to the cap plates 7 and 8, the optical fiber can be accurately positioned.

The pins 2a and 2b are accurately bonded and fixed to the fixed fiber holding block 6. On the contrary, the pins 2a and 2b can laterally move within the grooves 3a and 3b. Further, it is the limit point of movement where the pins 2a and 2b contact with side surface portions of the grooves 3a and 3b, and optical axes of the movable optical fibers 1a and 1b are set to coincide with any of optical axes of the output side optical fibers 4a to 4d when the pins come to the lateral limit points. As a result, it is possible to accurately position a relative position between the movable fiber holding block 5 and the fixed fiber holding block 6 and improve the reproducibility of the switching between the movable optical fibers 1a and 1b and the fixed optical fibers 4a to 4d.

In the present embodiment, the two movable optical fibers are moved in a lump. In the case of moving only one optical fiber, the optical fiber is bent and thus the connecting efficiency is reduced, however, in the case of simultaneously moving two or more optical fibers, it is possible to prevent the optical fiber from being bent and thus it is also possible to improve the efficiency of connecting the optical fibers.

Figure 1:
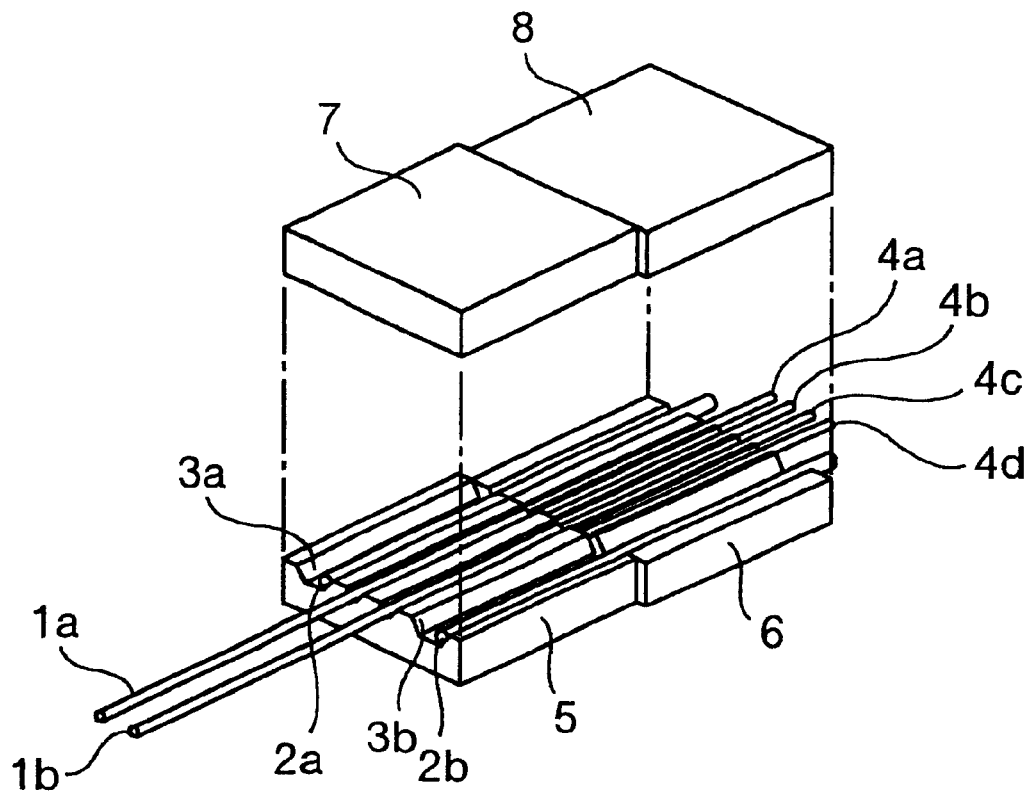
FIG. 1 is a detailed perspective view of an optical switching portion of an embodiment of an optical switch in accordance with the present invention.
Figure 2:
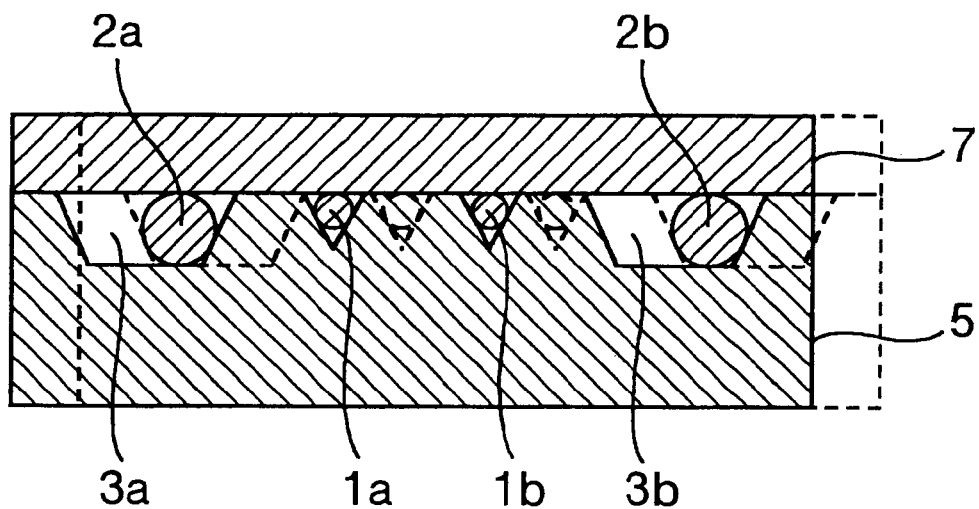
FIG. 2 is a cross sectional view illustrating a positioning method of the optical switching portion.

FIG. 2 shows a laterally cross sectional view of the optical switching portion of the optical switch shown in FIG. 1. The movable fiber holding block 5 and the cap plate 7 which hold the movable optical fibers 1a and 1b slide in a lateral direction with respect to the pins 2a and 2b, and the position at which each of the optical fibers is optically connected is switched. Accordingly, it is possible to accurately switch the position of the movable optical fiber by a compact and simple mechanism.

As mentioned above, in accordance with the present embodiment described in FIGS. 1 to 3, the light input from one input fiber 19 is transferred to the middle fiber 21a or the middle fiber 21b in accordance with the switching position of the movable fiber holding block 13. Further, the input light is transferred to any one of the fixed fibers 20a to 20d in accordance with the switching position of the movable fiber holding block 14. As a result, it is possible to form a 1×4 optical switch as a simple structure.

In this case, in accordance with the embodiment mentioned above, since the two middle fibers are constructed as a parallel leaf spring structure, the movable fiber holding blocks 13 and 14 move in parallel without rotating. As a result, angles between the lights emitted from the optical fibers are kept parallel, and thus a stable optical connection can be achieved. Further, since it is sufficient to move only two middle fibers for four outputs, required force is small in comparison with the case of the conventional four drive type, so that it is possible to make the actuator compact.

Figure 4A:
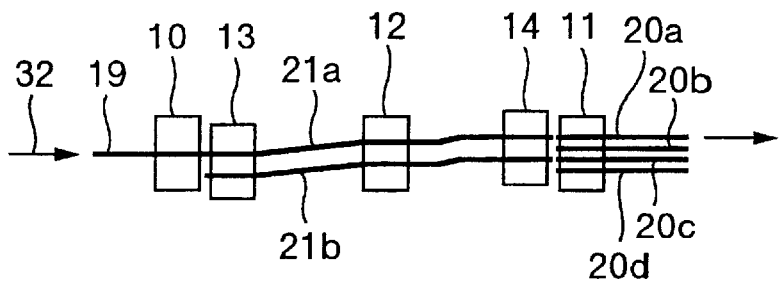
FIG. 4 is a schematic view illustrating a switching state of the 1×4 optical switch.

A description will be given of a particular switching method of the 1×4 optical switch having the structure mentioned above with reference to FIGS. 4A to 4D. These drawings correspond to a top elevational view of the optical switch in which a left side is set to an input side and a right side is set to an output side. In FIG. 4A, the movable fiber holding block 13 in an input side is switched to a lower side (right side), and the input fiber 19 is optically connected with the middle fiber 21a. In this state, the movable fiber holding block 14 in the output side is switched to an upper side (left side), and the middle fiber 21a is optically connected with the output fiber 20a. Accordingly, input light 32 which is input through the input optical fiber 19 is output from the output optical fiber 20a via the middle optical fiber 21a (FIG. 4A).

Figure 4B:
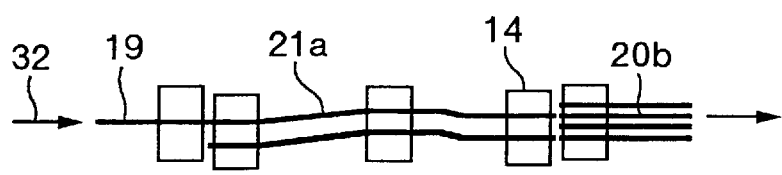

Next, only the movable fiber holding block 14 in the output side is switched to a lower side (right side). The input light 32 input through the input optical fiber 19 is output from the output optical fiber 20b via the middle optical fiber 21a (FIG. 4B).

Figure 4C:
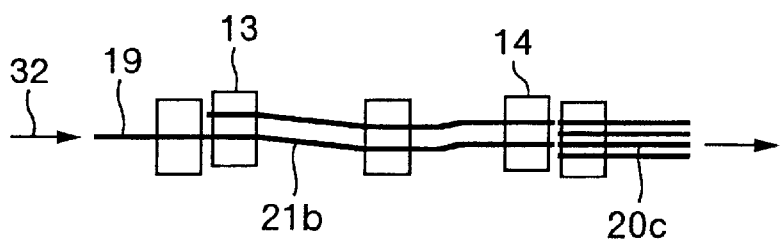

Further, only the movable fiber holding block 13 in the input side is switched to an upper side (right side) from the state shown in FIG. 4A. Accordingly, the input light 32 input through the input optical fiber 19 is output from the output optical fiber 20c via the middle optical fiber 21b (FIG. 4C).

Figure 4D:
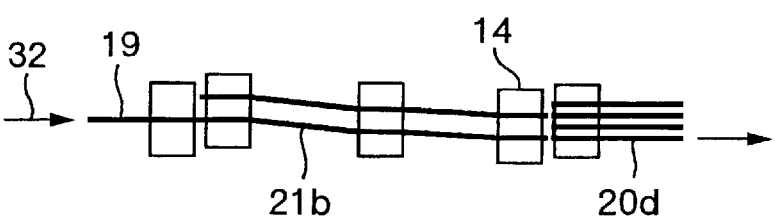

Further, in the case of switching the output side movable fiber holding block 14 to a lower side (right side) from this state, the input light 32 input through the input optical fiber 19 is output from the output optical fiber 20d via the output middle optical fiber 21b (FIG. 4D).

As mentioned above, in the 1×4 optical switch in accordance with the present embodiment, it is sufficient to move only the middle fibers 21a and 21b constituted by two fibers at a time of switching. Accordingly, it is possible to make the driving force of the fiber smaller than that of the conventional 1×4 optical switch, and it is possible to make the actuator compact.

Figure 5:
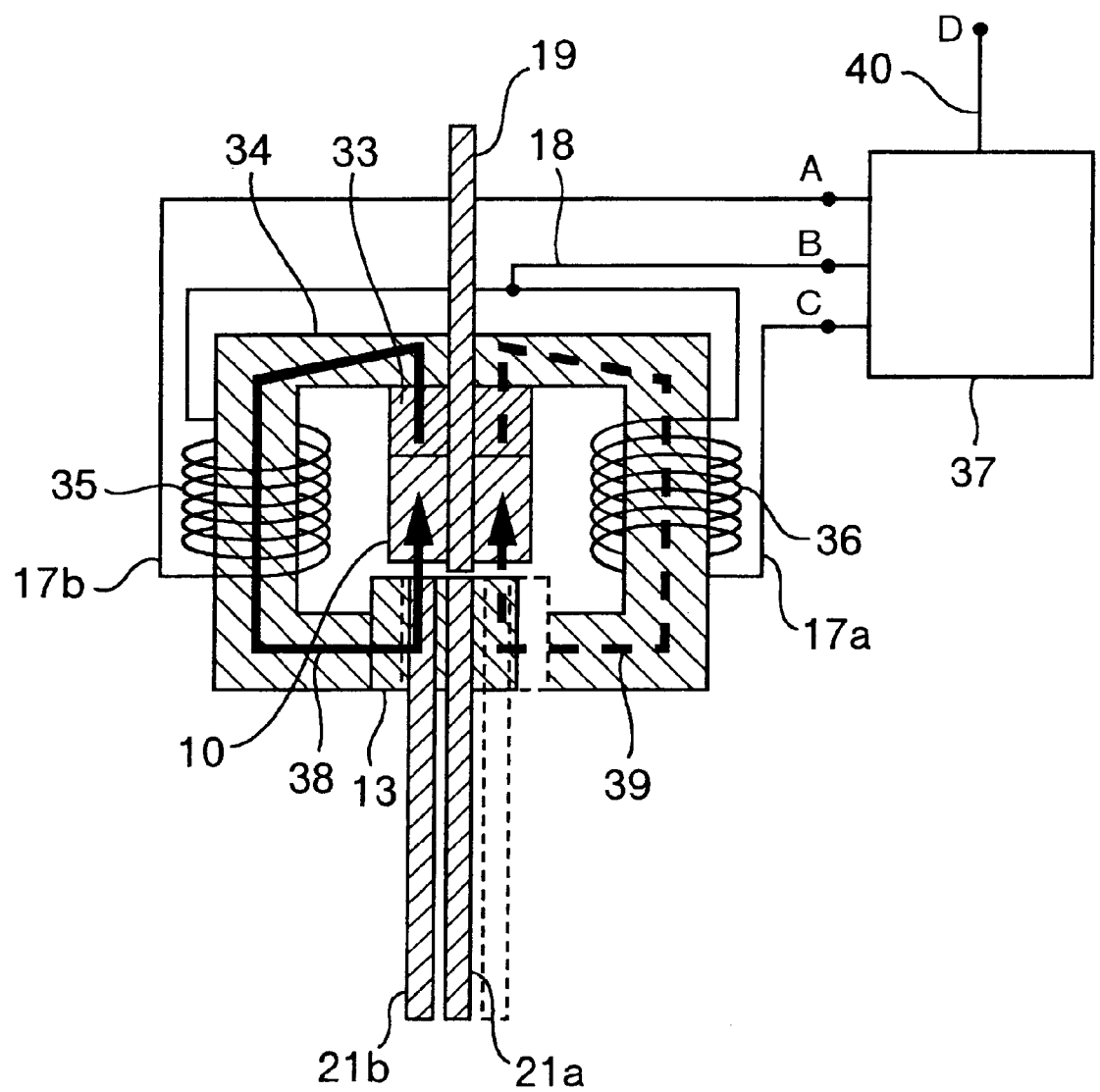
FIG. 5 is a schematic view illustrating a switching method and a position detecting method of the optical switch.

Next, a description will be given in detail of a driving method of the optical switch with reference to FIG. 5. Although FIG. 5 shows a case of driving the input side of the movable optical fibers 21a and 21b, the same manner may be applied to the output side.

A permanent magnet 33 of a ring shape is fixed on a periphery of the input optical fiber 19 at the front side of the fixed fiber holding block 10 holding the input optical fiber 19. An iron yoke 34 having a C-shaped cross section is attached on the periphery of the input optical fiber 19 at the further front side of the permanent magnet 33. The yoke 34 is formed in a shape which surrounds the permanent magnet 33, the fixed fiber holding block 10 and the movable fiber holding block 13. The open end of the C-shaped yoke 34 is arranged so as to forming a little gap with each side surface of the movable fiber holding block 13.

Coils 35 and 36 are wound around the yoke 34. A material diameter of the coil is 0.09 mm and the winding number of each of the coils 35 and 36 is 400 turns. A cross sectional area of the yoke 34 in a portion where the coil is wound is about 3 mm². The driving electrode 17a is connected to the coil 35 and the driving electrode 17b is connected to the coil 36. Further, the coils 35 and 36 are electrically connected to each other, and the detecting electrode 18 is connected to the connecting portion therebetween.

The driving electrodes 17a and 17b are connected to a controller 37. The controller 37 supplies an electric current to the driving electrodes 17a and 17b for driving the actuator. For example, it is assumed that a leftward turning magnetic flux 38 flows in a closed manner as shown by an arrow in FIG. 5. When supplying the electric current from the driving electrode 17b toward the driving electrode 17a between the driving electrodes 17a and 17b, the coil 35 generates a magnetic field in a direction opposite to the magnetic flux.

At this time, a rightward turning magnetic filed is also generated in the coil 36 in a direction of strengthening a magnetic flux 39 shown by an dotted arrow in FIG. 5. When the magnetic flux 39 shown by the dotted arrow becomes stronger than the magnetic flux 38 shown by the arrow, the movable fiber holding block 13 is attracted to a right direction and is adsorbed to a position shown by a dotted line. Due to an effect of the permanent magnet 33, the position is kept even when the electric current is set to zero after the adsorption. If the electric current is supplied in an opposite direction to that mentioned above, the movable fiber holding block 13 is adsorbed to a left side and held. The light input from the input optical fiber 19 due to this switching operation is input to any one of the middle optical fiber 21a and the middle optical fiber 21b.

The controller 37 generates an alternating current. It is assumed that the movable fiber holding block 13 is switched to the left side as shown by a solid line in FIG. 5. An alternating current having the amplitude of 0.5 volts in one side and a frequency of 5 kHz flows between the driving electrode 17a and 17b. Since an inductance of the coil 35 is larger than an inductance of the coil 36, a potential difference between both ends of the coil 35, that is, a potential difference between the driving electrode 17b and the detecting electrode 18 becomes larger than a potential difference between both ends of the coil 36, that is, a potential difference between the driving electrode 17a and the detecting electrode 18. By amplifying each of the potential differences so as to compare with each other and outputting from a signal line 40, it is possible to detect a switching state of the optical switch from the external of the switch.

In the embodiment mentioned above, the fixed fiber holding block is made of a soft magnetic material. As a soft magnetic material, there is known a manganese-zinc-ferrite material. When using the soft magnetic material, it is possible to realize an optical switch having a high performance. Further, since it is required that the positioning accuracy of the optical fiber is equal to or less than 1 micron, the pin holding groove and the optical fiber holding groove formed in the holding block of the optical fiber are formed by precise grinding work. As a result of that, it is possible to achieve the positioning in the sub-micron order.

Furthermore, since the magnetic actuator is provided in the both end portions of the middle optical fiber, it is possible to prevent the magnetic interference between the actuators which is caused by the excitation generated at a time of operating the actuators.

As mentioned above, in accordance with the present embodiment, it is possible to realize the 1×4 optical switch having a high optical combining efficiency. Also, it is possible to switch by small driving force. Further, since it is possible to electrically detect a switching state of the switch, it is possible to realize an optical switch having a high reliability.

As mentioned above, in accordance with the present invention, it is possible to realize a small-sized and compact optical switch of one input and four outputs type.

What is claimed is:

1. An optical switch comprising:

a substrate;

a first fixing member for fixing one end of a first optical fiber to one end portion of the substrate;

a second fixing member for fixing at least two ends of second optical fibers to another end portion of the substrate;

a fiber array comprising at least two movable optical fibers disposed in parallel, of which a middle section is fixed to the substrate so that the fiber array extends between the end portions of the substrate;

a holding member for connecting ends of the movable optical fibers of the fiber array with ends of the first and second optical fibers at each end of the substrate; and a driving device for moving at least one end of the fiber array with respect to the substrate.

2. An optical switch according to claim 1, wherein the second fixing member fixes four ends of the second optical fibers, and the fiber array consists of two movable optical fibers.

3. An optical switch according to claim 2, wherein the fiber array and the holding member provide a parallel leaf spring structure in which the fiber array operates as an elastic body, and the driving device moves the holding member with respect to the substrate to move the at least one end of the fiber array.

4. An optical switch according to claim 3, wherein the holding member includes two holding member portions, each of the first fixing member, the second fixing member and the holding member portions being made of a soft magnetic material, and the driving device is an electromagnetic actuator cooperating with the first and second fixing members and the holding member portions, so that the holding member portions are accurately positioned with respect to the first fixing member and the second fixing member respectively.

5. An optical switch according to claim 1, wherein the holding member includes two holding member portions, and the driving device moves at least one of the two holding member portions for moving at least one end of the fiber array to effect connection of at least one end of the at least one of the movable optical fibers at at least one of the end portions of the substrate.

6. An optical switch comprising:

a substrate;

a first fixing member for fixing one end of an optical fiber to one end portion of the substrate;

a second fixing member for fixing at least two ends of optical fibers to another end portion of the substrate;

a fiber array comprising at least two optical fibers disposed in parallel, of which a middle section is fixed to the substrate so that the fiber array extends between the end portions of the substrate; and a movable device for moving an end of the fiber array with respect to the substrate;

wherein the second fixing member fixes four ends of optical fibers, and the fiber array comprises two optical fibers, and the movable device comprises a driving device provided on each end portion of the substrate for removing respective ends of the fiber array; and wherein a holding member is provided on each end portion of the fiber array so as to form a parallel spring structure in which the fiber array operates as an elastic body, and the driving device moves the holding member with respect to the substrate for moving the end of the fiber array.

7. An optical switch according to claim 6, wherein the holding member includes two holding member portions, each of the first fixing member, the second fixing member and the holding member portions being made of a soft magnetic material, and the driving device is an electromagnetic actuator cooperating with the first and second fixing members and the holding member portions, so that the holding member portions are accurately positioned with respect to the first fixing member and the second fixing member respectively.

* * * * *